(12) United States Patent
Schumacher et al.

(10) Patent No.: US 8,955,298 B2
(45) Date of Patent: Feb. 17, 2015

(54) MOWING FINGER ARRANGEMENT

(71) Applicant: Erfindergemeinschaft Gustav und Fred Schumacher GbR, Eichelhardt (DE)

(72) Inventors: Friedrich-Wilhelm Schumacher, Birnbach (DE); Gustav Schumacher, Eichelhardt (DE)

(73) Assignee: Erfindergemeinschaft Gustav und Fred Schumacher GbR, Eichelhardt (DE)

( * ) Notice: Subject to any disclaimer, the term of this patent is extended or adjusted under 35 U.S.C. 154(b) by 0 days.

(21) Appl. No.: 13/625,407

(22) Filed: Sep. 24, 2012

(65) Prior Publication Data
US 2013/0081371 A1 Apr. 4, 2013

(30) Foreign Application Priority Data
Sep. 30, 2011 (EP) .................................. 11183552

(51) Int. Cl.
*A01D 34/00* (2006.01)
*A01D 34/18* (2006.01)
(52) U.S. Cl.
CPC ..................... *A01D 34/18* (2013.01)
USPC ......................................................... 56/310

(58) Field of Classification Search
USPC ............................. 56/298, 305, 307, 308, 310
See application file for complete search history.

(56) References Cited

U.S. PATENT DOCUMENTS

| 3,487,616 | A | * | 1/1970 | Schenk | 56/305 |
| 4,286,425 | A | * | 9/1981 | Schumacher et al. | 56/307 |
| 2002/0005035 | A1 | | 1/2002 | Hovsepian | |
| 2010/0251684 | A1 | | 10/2010 | Schumacher et al. | |

FOREIGN PATENT DOCUMENTS

| EP | 2 238 822 | 10/2010 |
| RU | 2 428 830 C2 | 9/2011 |
| WO | WO 2010/015083 | 2/2010 |

* cited by examiner

*Primary Examiner* — Thomas B Will
*Assistant Examiner* — Mai Nguyen
(74) *Attorney, Agent, or Firm* — Harness, Dickey & Pierce, P.L.C.

(57) ABSTRACT

A mowing finger arrangement has a lower element and an upper element connected to each other and forms two mowing fingers. A space is formed to accommodate a cutting device between the lower element and the upper element. The two mowing fingers are connected to each other via, respectively, a connection web on the upper element and on the lower element on a rear end of the mowing finger, when viewed in working direction. At least one of the connection webs has, at least portion wise, an off-set to provide an enlarged distance between the connection webs.

14 Claims, 2 Drawing Sheets

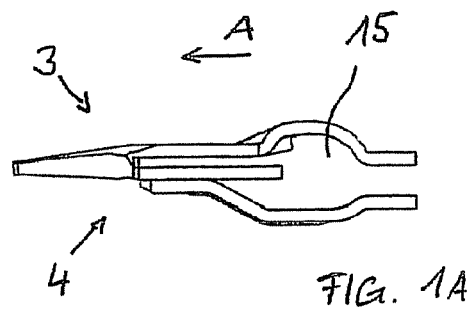
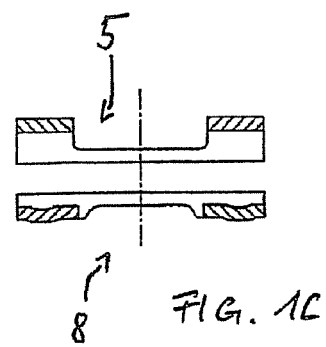
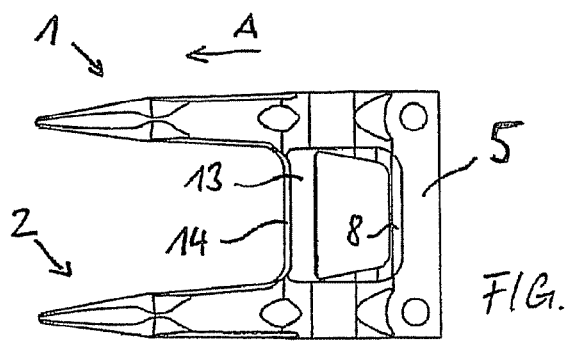
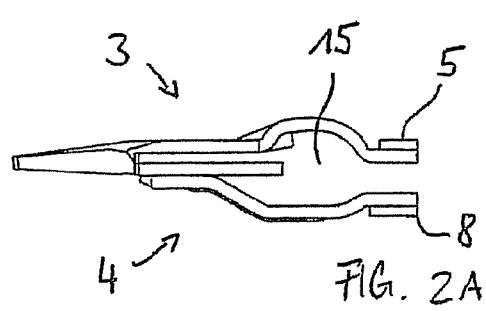
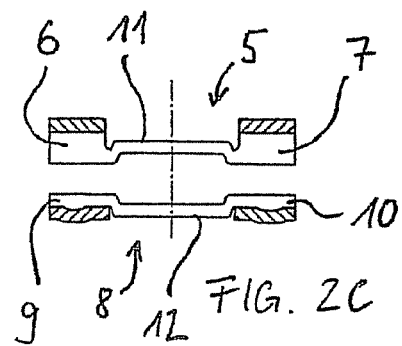
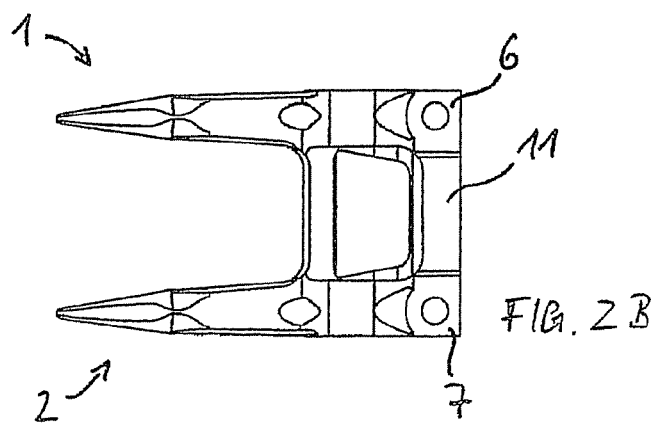

MOWING FINGER ARRANGEMENT

CROSS-REFERENCE TO RELATED APPLICATION

This application claims priority to European Patent Application No. 11183552.6 filed Sep. 30, 2011. The entire disclosure of the above application is incorporated herein by reference.

FIELD

The disclosure relates to a mowing finger arrangement, with a lower element and an upper element, that are connected to each other to form two mowing fingers. A space exists between the lower element and the upper element to accommodate a cutting device. The two mowing fingers are connected to each other by one connection web on the upper element and by one connection web on the lower element at a rear end of the mowing finger when viewed in working direction.

BACKGROUND

Mowing finger arrangements for finger bar mowers of harvesting machines serve to guide a sickle and form counter blades for the sickle blades arranged on the sickle. EP 2 238 822 A1 shows a double mowing finger that can be attached onto a finger bar. The double finger has an upper element and a lower element. A space is formed between the upper and lower elements to accommodate a cutting device. A screw connection attaches the sickle onto a sickle guide plate. A blade gap is formed between the lower element and the upper element to guide the sickle. To provide a mowing finger arrangement that has a high stability against applied transversal forces, the two mowing fingers are, when viewed in working direction, connected to each other via a rear and a front connection web on the upper element and via a rear and a front connection web on the lower element. The rear connection webs serve also to attach the double finger onto the finger bar. One disadvantage occurs, if the double finger has to be exchanged while the sickle is mounted, which is necessary when the mowing finger is damaged during operation, to minimise the down time of the harvesting machine. The cutting device has, in the area of the screw connection between the sickle guide plate and the sickle, a height vertical to the plane of the sickle that significantly exceeds the distance between the rear webs. Thus, for the assembly or disassembly of a double finger, this has to be bent at its rear end with more or less appropriate tools. Thus, the assembly or disassembly is cumbersome.

SUMMARY

It is an object of the disclosure to provide a mowing finger arrangement, during assembly or disassembly with a mounted sickle, that is simplified and has high stability.

The mowing finger arrangement according to the disclosure comprises a lower element and an upper element. The lower and upper elements are connected to each other and form two mowing fingers. A space is formed between the lower element and the upper element to accommodate a cutting device. The two mowing fingers are connected to each other at a rear end of the mowing finger, via one connection web on the upper element and one connection web on the lower element, when viewed in a working direction. The working direction means the working and movement direction of the harvesting machine. It is the direction in which the mowing finger is moved through the harvesting goods.

According to the disclosure at least one of the connection webs has, portion-wise, an off-set. The distance between the connection webs is enlarged by the off-set. The advantage is that the screw connection between the sickle guide plate and the sickle can, during disassembly, be passed through the area of the off-set. This is simplified because of the larger distance between the connection webs as the connection webs do not have to be bent open so far to insert the screw connection. Advantageously, the distance is so large, that the connection webs do not have to be bent at all during disassembly. As the enlarged distance is achieved by an off-set of one or both of the connection webs, the mounting dimension in the area of the screw connection between the mowing finger arrangement and a finger bar remains the same. Thus, the connection of the mowing finger arrangement, according to the disclosure, is advantageously not less stable than a double finger according to the state of the art.

A lower element and an upper element are preferably connected to each other. The two mowing fingers are formed with a blade gap. The blade gap is formed to guide a sickle between the lower element and the upper element. The lower element forms lower counter cutting edges. The upper element forms upper counter cutting edges for the sickle. The two mowing fingers are connected to each other via a rear and a front connection web on the upper element and a rear and a front connection web on the lower element. The two front connection webs of the lower and the upper element form part of the blade gap.

High stability of the upper element and, thus, of the whole mowing finger arrangement is achieved by two connection webs on the upper element. Thus, with a higher stability, the connection webs can be formed thinner than would be possible with only one connection web. Thus, the mowing finger has a bulge between the two connection webs on the upper element. The bulge has a higher degree of deformation than the state of the art. Thus, the bulge can be formed higher, to be able to mount a sickle with screw nuts facing upwards.

Preferably, the rear connection web of the upper element is arranged on a rear end of the mowing finger, when viewed in a working direction. In this case, the rear connection web of the upper element may serve to attach the mowing finger arrangement on a finger bar. The rear connection web of the lower element can also be arranged at a rear end of the mowing finger, when viewed in a working direction. Thus, it may serve to attach the mowing finger arrangement on the finger bar. During assembly of the mowing finger arrangement, the finger bar is arranged between the rear connection web of the upper element and the rear connection web of the lower element.

The two connection webs have at least portion-wise an off-set. Advantageously, a larger distance is achieved for disassembly. For this, the off-sets of the connection webs extend in opposite directions. This means that the connection webs are set off in opposite directions. Thus, this enlarges the gap between the connection webs. The at least one off-set is, preferably, produced by a stamping procedure.

The connection webs have, respectively, at both sides an attachment portion to attach the mowing finger arrangement on a finger bar. The off-set is provided only outside the attachment portions. The off-set is arranged between the respective attachment portions.

A distance is formed, respectively, between opposite attachment portions arranged on different connection webs. The distance corresponds to a mounting dimension of the cutting device. The mounting dimension is the dimension, which results from a thickness of the sickle bar and a thickness of a sickle guide plate. Preferably, the distance between the connection webs in the area of the at least one off-set exceeds the mounting dimension. The distance between the connection webs corresponds in the area of the at least one off-set to at least one bolt length of the screw of a screw connection, by which the sickle is attached. The mounting dimension is, preferably, 10 mm and 20 mm, and, especially, 12 mm, 14 mm or 17 mm. The distance of the connection webs in the area of the at least one off-set exceeds the mounting dimension preferably by 20% to 100%, especially by 30% to 70%.

Further areas of applicability will become apparent from the description provided herein. The description and specific examples in this summary are intended for purposes of illustration only and are not intended to limit the scope of the present disclosure.

DRAWINGS

Followingly, the disclosure is described in detail by means of an embodiment in the drawings. The embodiments are exemplary and do not limit the general inventive idea.

FIG. 1A is a side elevation view of a double mowing finger according to the state of the art;

FIG. 1B is a top plan view of a double mowing finger according to the state of the art;

FIG. 1C is a cross-section view of a double mowing finger according to the state of the art;

FIG. 2A is a side elevation view of an embodiment of an improved mowing finger arrangement;

FIG. 2B is a top plan view of an embodiment of the improved mowing finger arrangement;

FIG. 2C is a cross-section view of an embodiment of the improved mowing finger arrangement;

DETAILED DESCRIPTION

Figure 3:
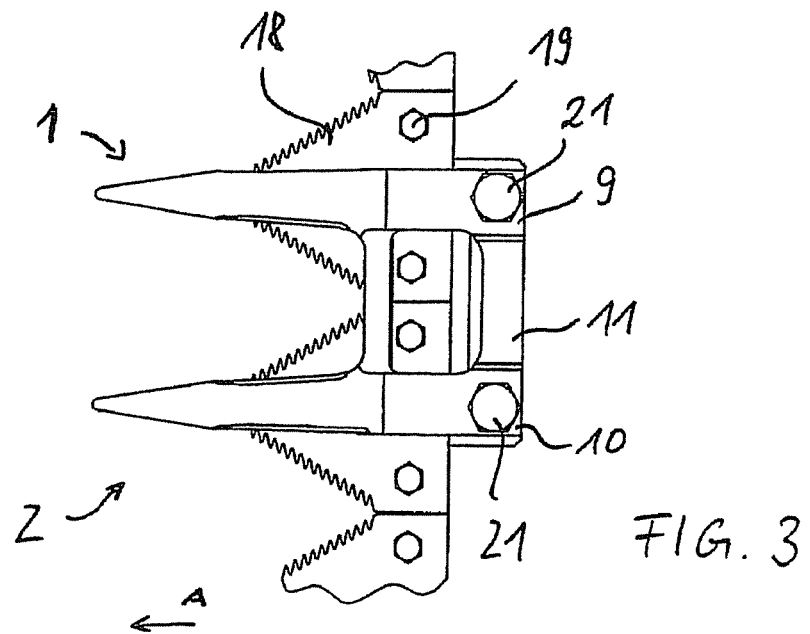
FIG. 3 is a top plan view of the mowing finger arrangement of FIGS. 2A, 2B, 2C in the mounted condition with a sickle.

Example embodiments will now be described more fully with reference to the accompanying drawings.

A double mowing finger according to the state of the art is shown in FIGS. 1A, 1B, 1C. The mowing finger arrangement has a first mowing finger 1 and a second mowing finger 2. They extend forward in a working direction A. Working direction A means the movement direction of the whole mower during the mowing operation. The mowing finger arrangement has an upper element 3 and a lower element 4 connected in a known manner. In a side view, when seen transversally to the working direction A, a space 15 is formed between the upper element 3 and the lower element 4. A screw connection of the cutting device (not shown) is oscillatingly movable transversally to the working direction A, as this is generally known from the state of the art.

The upper element 3 has on the end, inverse to the working direction A, a rear connection web 5 of the upper element 3. It connects the first mowing finger 1 to the second mowing finger 2. Attachment bores, by which the mowing finger arrangement can be attached to a finger bar of a mower (not shown), are provided in the rear connection web 5 of the upper element 3.

An upper front connection web 13 of the upper element 3 is provided between the two mowing fingers 1, 2. The front connection web 13 of the upper element 3 has a rear edge, which is facing the rear connection web 5 of the upper element 3. An opening, which extends into the rear connection web 5 of the upper element 3, is formed between the connection webs 5, 13 of the upper element 3.

The front connection web 13 of the upper element 3 is arranged approximately parallel to a front connection web 14 of the lower element 4. The mowing fingers 1, 2 have at a rear end, when viewed in working direction A, a rear connection web 8 of the lower element 4. Attachment bores are provided in the web 8. The bores aligned with the attachment bores of the upper element 3. Thus, by means of all attachment bores, the mowing finger arrangement can be mounted on a finger bar by attachment screws (not shown).

When the double finger according to FIGS. 1A, 1B, 1C becomes damaged during operation in the mounted condition on the sickle, it has to be exchanged. The problem arises, that the cutting device has, in area of the screw connection between the sickle, a vertical height to the plane of the sickle, that significantly exceeds the distance between the rear webs 5, 8. Thus, for the assembly or the disassembly of a double finger and to reduce the down time of the harvesting machine, this finger has to be bent at its rear end. Accordingly, the assembly or disassembly is cumbersome.

A mowing finger arrangement according to the disclosure in the form of a double mowing finger is shown in FIGS. 2A, 2B, 2C and are described together. Generally, identical components are designated as in FIGS. 1A, 1B, 1C and are not described again. The connection web 5 of the upper element 3 and/or the connection web 8 of the lower element 4 have an off-set 11, 12. The off-sets 11, 12 are locally limited deformations of the connection webs. The distance between the connection webs 5, 8 is enlarged. The upper connection web 5 has attachment portions 6, 7, that are arranged outside of the off-set 11. The lower element connection web 8 has attachment portions 9, 10 that are also arranged outside the off-set 11. By means of the attachment portions 6, 7, 9, 10, the mowing finger arrangement can be securely and in a stable manner attached to the finger bar (not shown). The off-sets 11, 12 offer an advantageous larger distance to pass through the cutting device (not shown), without limiting stability.

In FIG. 3 the mowing finger arrangement of FIGS. 2A, 2B, 2C is shown in the assembled condition with a sickle 18. The sickle blades are triangularly formed in the top view. The tip of the triangle points forward in the working direction. This is generally known from the state of the art. The screw connections 19 serve to attach the sickle 18. The screw connections 21 are provided to attach the mowing finger arrangement itself.

Figure 4:
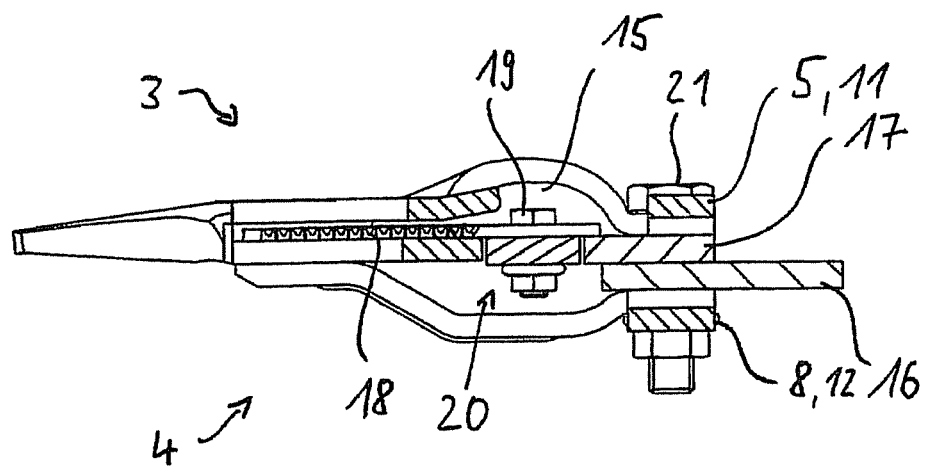
FIG. 4 is a cross-sectional view of the mowing finger arrangement of FIG. 3.

The height of the screw connection 19 is best visible in FIG. 4. This corresponds to a bolt length of the screw used to connect the cutting device 20. By means of the off-sets 11, 12 of the connection webs 5, 8, the distance of the connection webs 5, 9 relative to the so-called mounting dimension are visibly enlarged. The mounting dimension results from the thickness of the sickle bar 16 and of the sickle guide plate 17. It is maintained in the attachment portions 9, 10 as the distance between the upper element 3 and the lower element 4. The mounting dimension is, preferably, 10 mm and 20 mm, and, especially, 12 mm, 14 mm or 17 mm. The distance of the connection webs in the area of the at least one off-set exceeds the mounting dimension preferably by 20% to 100%, especially by 30% to 70%. Thus, a stable attachment of the mowing finger arrangement is achieved.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A mowing finger arrangement comprising:
a lower element and an upper element are connected to each other and form two mowing fingers;
a space is formed between the lower element and the upper element for accommodating a cutting device;
the two mowing fingers are connected to each other by one connection web on the upper element extending between the two mowing fingers and by one connection web on the lower element extending between the two mowing fingers, the connection webs being arranged at a rear end of the mowing fingers when viewed in a working direction wherein ends of both connection webs include attachment portions, the connection webs have a length between the attachment portions and a width in the working direction; and
at least one of the connection webs has at least portion-wise an off-set between the attachment portions, and the off-set extending across the width of the connection webs and across the length distance between the connection webs is enlarged by the off-set to enable a cutting device to pass through the connection webs.

2. The mowing finger arrangement according to claim 1, wherein both connection webs have at least portion-wise an off-set.

3. The mowing finger arrangement according to claim 2, wherein the off-sets of the connection webs deviate, respectively, in opposite directions.

4. The mowing finger arrangement according to claim 1, wherein the at least one off-set is produced by a stamping procedure.

5. The mowing finger arrangement according to claim 1, wherein the connection webs have, respectively, at both sides an attachment portion for attaching the mowing finger arrangement on a finger bar.

6. The mowing finger arrangement according to claim 5, wherein the off-set is arranged between the respective attachment portions.

7. The mowing finger arrangement according to claim 1, wherein a distance formed between the respective opposite attachment portions arranged on different connection webs corresponds to a mounting dimension of the cutting device, wherein the mounting dimension results from a thickness of the sickle bar and a thickness of a sickle guide plate.

8. The mowing finger arrangement according to claim 7, wherein a distance between the connection webs in the area of the at least one off-set exceeds the mounting dimension.

9. The mowing finger arrangement according to claim 1, wherein a distance between the connection webs corresponds, in an area of the at least one off-set, to at least one bolt length of a screw connection.

10. The mowing finger arrangement according to claim 7, wherein the mounting dimension is between 10 mm and 20 mm.

11. The mowing finger arrangement according to claim 7, wherein the distance of the connection webs exceeds, in an area of the at least one off-set, the mounting dimension by 20% up to 100%.

12. The mowing finger arrangement according to claim 7, wherein the mounting dimension is 12 mm, 14 mm or 17 mm.

13. The mowing finger arrangement according to claim 7, wherein the distance of the connection webs exceeds, in an area of the at least one off-set, the mounting dimension by 30% up to 70%.

14. A mowing finger arrangement comprising:
a lower element and an upper element are connected to each other and form two mowing fingers;
a space is formed between the lower element and the upper element for accommodating a cutting device;
the two mowing fingers are connected to each other by one connection web on the upper element extending between the two mowing fingers and by one connection web on the lower element extending between the two mowing fingers, the connection webs being arranged at a rear end of the mowing fingers when viewed in a working direction wherein ends of both connection webs include attachment portions, the connection webs have a length between the attachment portions and a width in the working direction; and
at least one of the connection webs has at least portion-wise an off-set between the attachment portions, and the off-set extending across the width of the connection webs and across the length distance between the connection webs is enlarged by the off-set to enable a cutting device to pass through the connection webs, the off-set is positioned at a sickle guide and sickle bar.

* * * * *

UNITED STATES PATENT AND TRADEMARK OFFICE
CERTIFICATE OF CORRECTION

PATENT NO. : 8,955,298 B2
APPLICATION NO. : 13/625407
DATED : February 17, 2015
INVENTOR(S) : Friedrich-Wilhelm Schumacher et al.

It is certified that error appears in the above-identified patent and that said Letters Patent is hereby corrected as shown below:

Title Page, Item (30) Foreign Application Priority Data, "11183552" should be – 11183552.6

Signed and Sealed this
Thirtieth Day of June, 2015

Michelle K. Lee
*Director of the United States Patent and Trademark Office*